(12) United States Patent
Shimono

(10) Patent No.: US 11,079,708 B2
(45) Date of Patent: Aug. 3, 2021

(54) IMAGE FORMING SYSTEM AND ABNORMAL SHEET INFORMATION DISPLAY METHOD

(71) Applicant: Konica Minolta, Inc., Tokyo (JP)

(72) Inventor: Kazunari Shimono, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/821,296

(22) Filed: Mar. 17, 2020

(65) Prior Publication Data

US 2020/0301337 A1    Sep. 24, 2020

(30) Foreign Application Priority Data

Mar. 18, 2019  (JP) .............................. JP2019-049684

(51) Int. Cl.
 *G03G 15/00* (2006.01)
 *B41J 29/38* (2006.01)
(52) U.S. Cl.
 CPC .............. *G03G 15/55* (2013.01); *B41J 29/38* (2013.01); *G03G 15/5016* (2013.01)
(58) Field of Classification Search
 CPC ........... G03G 15/5016; G03G 15/5029; G03G 15/5062; G03G 15/55
 USPC ................................................ 399/9, 16, 18
 See application file for complete search history.

(56) References Cited

U.S. PATENT DOCUMENTS 7,558,495 B2 * 7/2009 Ohmiya ............. G03G 15/5029
                                              399/381
9,857,752 B2 * 1/2018 Nishi ..................... G03G 15/70

FOREIGN PATENT DOCUMENTS

JP       2005144797 A     6/2005
JP       2016061603 A     4/2016

* cited by examiner

*Primary Examiner* — Hoan H Tran
(74) *Attorney, Agent, or Firm* — Cantor Colburn LLP

(57) ABSTRACT

An image forming system includes: a sheet feeder; an image former that forms an image on a paper sheet; a conveyor that conveys a paper sheet to a sheet ejection destination; a switcher that switches sheet ejection destinations; a reader that optically reads a paper sheet, and outputs a read image; an abnormal sheet detector that detects an abnormal paper sheet by analyzing the read image; a storage; a display; and a hardware processor that performs: ejection destination switch control to control the switcher to eject an abnormal paper sheet and a succeeding paper sheet to a second ejection destination different from a regular ejection destination; storage control, for each of the abnormal paper sheet and the succeeding paper sheet, to associate sheet information, the read image, and a stacking order with one another, and store them into the storage; and display control to cause the display to display them.

13 Claims, 19 Drawing Sheets

FIG. 6

| EJECTION DESTINATION | STACKING ORDER | SHEET INFORMATION (ABNORMALITY/SUCCEEDING/ADJUSTMENT, EJECTION DATE AND TIME, JOB NAME, PAGE NUMBER, CAUSE OF ABNORMALITY) | READ IMAGE |
|---|---|---|---|
| SUB-TRAY 1 | 1 | ABNORMAL, 2018.11.14 14:00, JOB 1, P3, STAIN | img003 |
| SUB-TRAY 1 | 2 | ABNORMAL, 2018.11.14 14:00, JOB 1, P4, STREAKS | img004 |
| SUB-TRAY 1 | 3 | SUCCEEDING, 2018.11.14 14:00, JOB 1, P5, — | img005 |
| ... | ... | ... | ... |

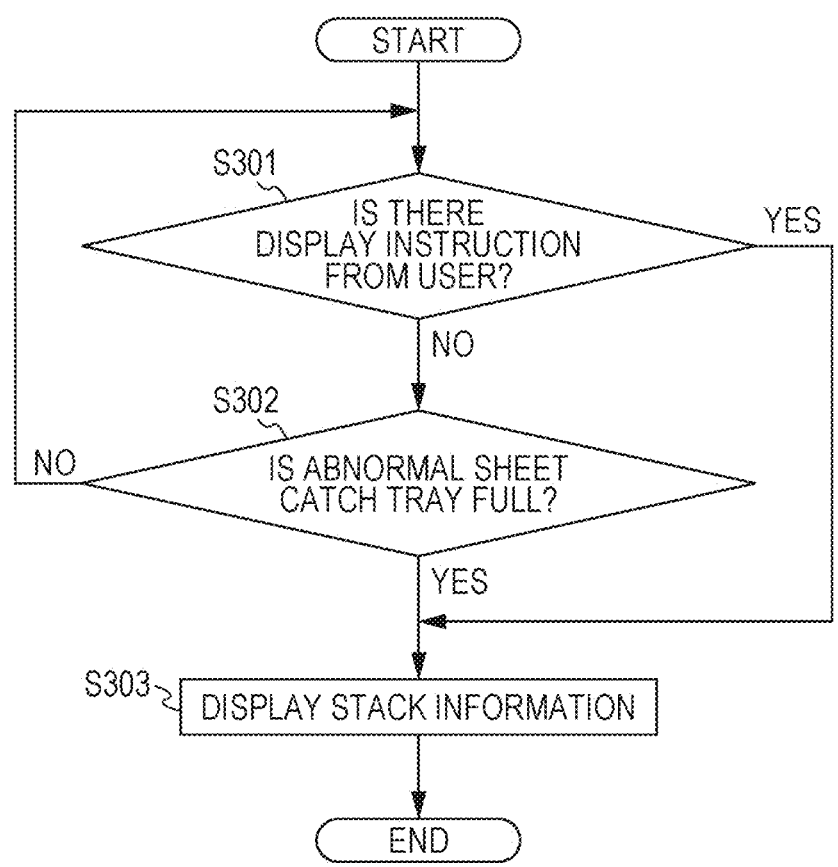

FIG. 8

| INFORMATION | EJECTION DESTINATION | EJECTION ORDER | EJECTION DATE AND TIME | JOB NAME | PAGE NUMBER | CAUSE OF ABNORMALITY | READ IMAGE |
|---|---|---|---|---|---|---|---|
| ABNORMAL SHEET | SUB-TRAY 1 | 1 | 2018.11.14 14:00 | 1 | 3 | STAIN | ICON |
| ABNORMAL SHEET | SUB-TRAY 1 | 2 | 2018.11.14 14:00 | 1 | 4 | STREAKS | ICON |
| SUCCEEDING SHEET | SUB-TRAY 1 | 3 | 2018.11.14 14:00 | 1 | 5 | – | ICON |
| SUCCEEDING SHEET | SUB-TRAY 1 | 4 | 2018.11.14 14:00 | 1 | 6 | – | ICON |
| SUCCEEDING SHEET | SUB-TRAY 1 | 5 | 2018.11.14 14:00 | 1 | 7 | – | ICON |
| SUCCEEDING SHEET | SUB-TRAY 1 | 6 | 2018.11.14 14:01 | 1 | 8 | – | ICON |
| SUCCEEDING SHEET | SUB-TRAY 1 | 7 | 2018.11.14 14:01 | 1 | 9 | – | ICON |
| SUCCEEDING SHEET | SUB-TRAY 1 | 8 | 2018.11.14 14:01 | 1 | 10 | – | ICON |
| ABNORMAL SHEET | SUB-TRAY 1 | 9 | 2018.11.14 14:10 | 2 | 1 | STAIN | ICON |
| SUCCEEDING SHEET | SUB-TRAY 1 | 10 | 2018.11.14 14:10 | 2 | 2 | – | ICON |
| SUCCEEDING SHEET | SUB-TRAY 1 | 11 | 2018.11.14 14:10 | 2 | 3 | – | ICON |
| SUCCEEDING SHEET | SUB-TRAY 1 | 12 | 2018.11.14 14:10 | 2 | 4 | – | ICON |
| ... | ... | ... | ... | ... | ... | ... | ... |

90

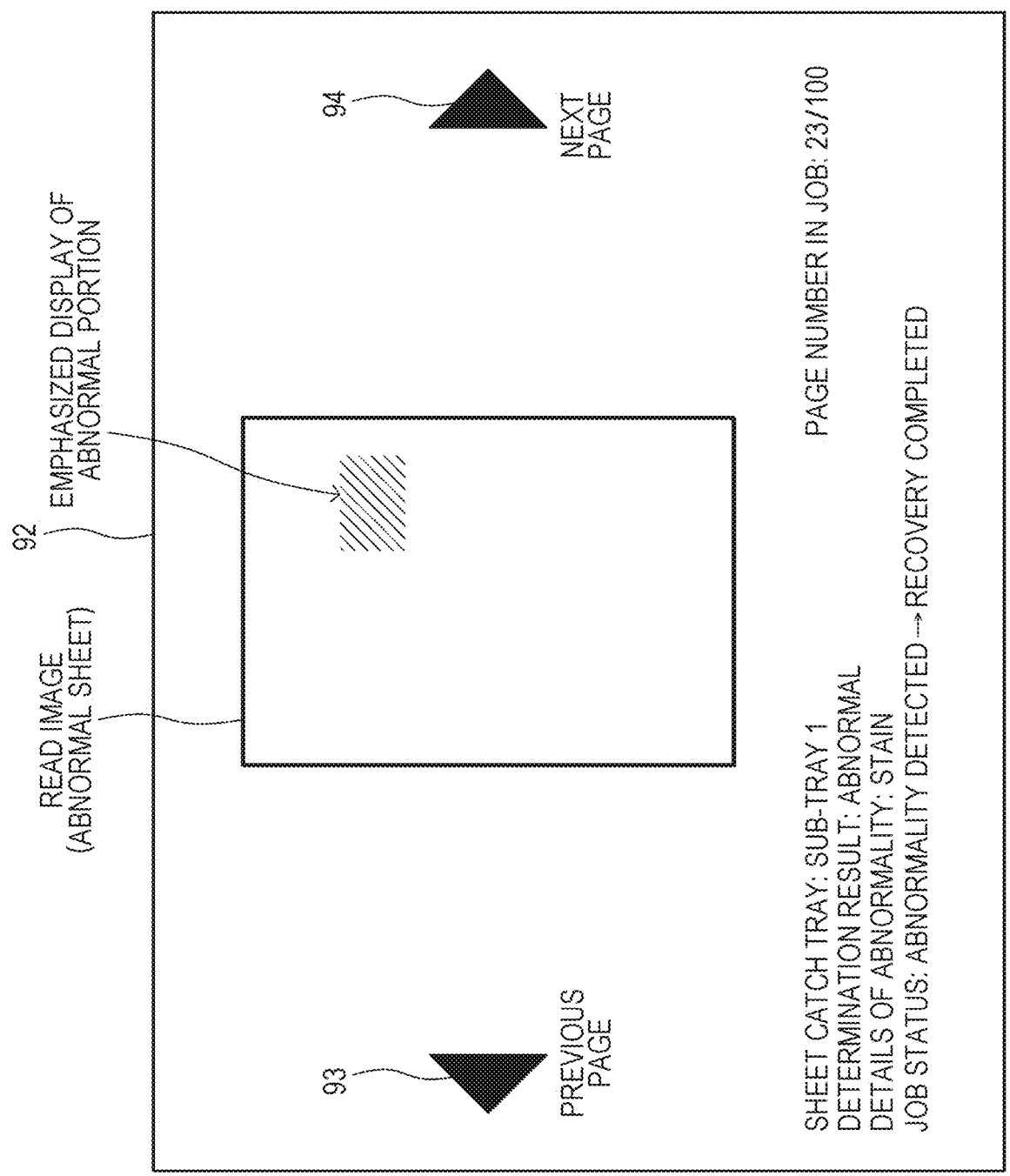

IMAGE FORMING SYSTEM AND ABNORMAL SHEET INFORMATION DISPLAY METHOD

CROSS REFERENCE TO RELATED APPLICATIONS

The present invention claims priority under 35 U.S.C. § 119 to Japanese Application No. 2019-049684 filed Mar. 18, 2019, the entire content of which is incorporated herein by reference.

BACKGROUND

Technological Field

The present invention relates to an image forming system that ejects an abnormal paper sheet and the succeeding paper sheets to a different ejection destination from the regular ejection destination, and an abnormal sheet information display method.

Description of the Related Art

In a printing apparatus or the like for production printing, control is performed to eject a paper sheet having an abnormality in an image to a different sheet ejection destination from the sheet ejection destination of paper sheets on which printing has been appropriately performed. For example, JP 2005-144797 A discloses a printing apparatus that determines whether a particular event that affects an image, such as sheet feeder switching, full load, paper depletion, a paper jam, or expiration of life of a consumable supply, has occurred during an image output process, and, on the basis of the result of the detection, ejects each affected paper sheet to an escape sheet ejection destination that is different from the regular ejection destination. Further, in this printing apparatus, information, such as the job name, the cause of the defect, the time, and the page number, about a paper sheet ejected to the escape sheet ejection destination is printed on a header page, and the header page is output to the escape sheet ejection destination. In this manner, checking of the details of an abnormality is facilitated.

JP 2016-61603 A discloses an apparatus that detects a defect by reading a printed material output from a printing apparatus with a testing apparatus independent of the printing apparatus. The apparatus displays, in a list, the job number, the number of copies, the page number, the front/back side, the number of defects, a read image, detailed information, and the like about a defective paper sheet, and positions and projects defect information onto the actual defective portion of the printed material.

In a case where an abnormal paper sheet is detected in a printing apparatus, not only the abnormal paper sheet is ejected to a sheet catch tray (a second sheet catch tray) different from the regular sheet catch tray, but also the abnormal paper sheet and the succeeding paper sheets are ejected to the second sheet catch tray. For example, an abnormal paper sheet appears in a first job, and the abnormal paper sheet and the succeeding paper sheets of the first job are ejected to the second sheet catch tray. If an abnormal paper sheet also appears in a second job being executed immediately after the first job, the abnormal paper sheet and the succeeding paper sheets of the second job are ejected to the second sheet catch tray and are stacked on the abnormal paper sheet and the succeeding paper sheets of the first job. In a case where abnormal paper sheets and succeeding paper sheets of a plurality of jobs are stacked on the second sheet catch tray in this manner, it is difficult to find and retrieve a target abnormal paper sheet from among the paper sheets stacked on the second sheet catch tray, even if defect information about the abnormal paper sheet is displayed in a list or is printed out as disclosed in JP 2005-144797 A or JP 2016-61603 A.

SUMMARY

The present invention is to solve the above problem, and aims to provide an image forming system and an abnormal sheet information display method for easily finding and retrieving a target abnormal paper sheet among abnormal paper sheets and the succeeding paper sheets ejected to a different sheet catch tray from the regular sheet catch tray.

To achieve the abovementioned object, according to an aspect of the present invention, an image forming system reflecting one aspect of the present invention comprises: a sheet feeder; an image former that forms an image on a paper sheet; a conveyor that conveys a paper sheet supplied from the sheet feeder to a sheet ejection destination via the image former; a switcher that switches sheet ejection destinations; a reader that optically reads a paper sheet being conveyed by the conveyor between the image former and the switcher, and outputs a read image; an abnormal sheet detector that detects an abnormal paper sheet by analyzing the read image; a storage; a display; and a hardware processor that performs: ejection destination switch control to control the switcher to eject an abnormal paper sheet detected by the abnormal sheet detector and a succeeding paper sheet following the abnormal paper sheet to a second ejection destination different from a regular ejection destination; storage control, for each of the abnormal paper sheet and the succeeding paper sheet ejected to the second ejection destination, to associate sheet information indicating whether a paper sheet is an abnormal paper sheet, the read image of the paper sheet, and a stacking order of the paper sheet at the second ejection destination with one another, and store the sheet information, the read image, and the stacking order into the storage; and display control to cause the display to display the sheet information, the stacking order, and the read image associated with one another and stored in the storage, the sheet information, the stacking order, and the read image being associated with one another on the display.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a diagram showing an example of a sheet ejection information table;

FIG. 7 is a flowchart showing a process of displaying the sheet ejection information about the paper sheets ejected to a second sheet catch tray;

FIG. 8 shows an example of a sheet ejection information list that shows the sheet ejection information about the paper sheets ejected to a second ejection destination in a list format;

FIG. 9 is a diagram showing an example of a confirmation screen in a page turning format (a page-by-page screen);

DETAILED DESCRIPTION OF EMBODIMENTS

Hereinafter, one or more embodiments of the present invention will be described with reference to the drawings. However, the scope of the invention is not limited to the disclosed embodiments.

Figure 1:
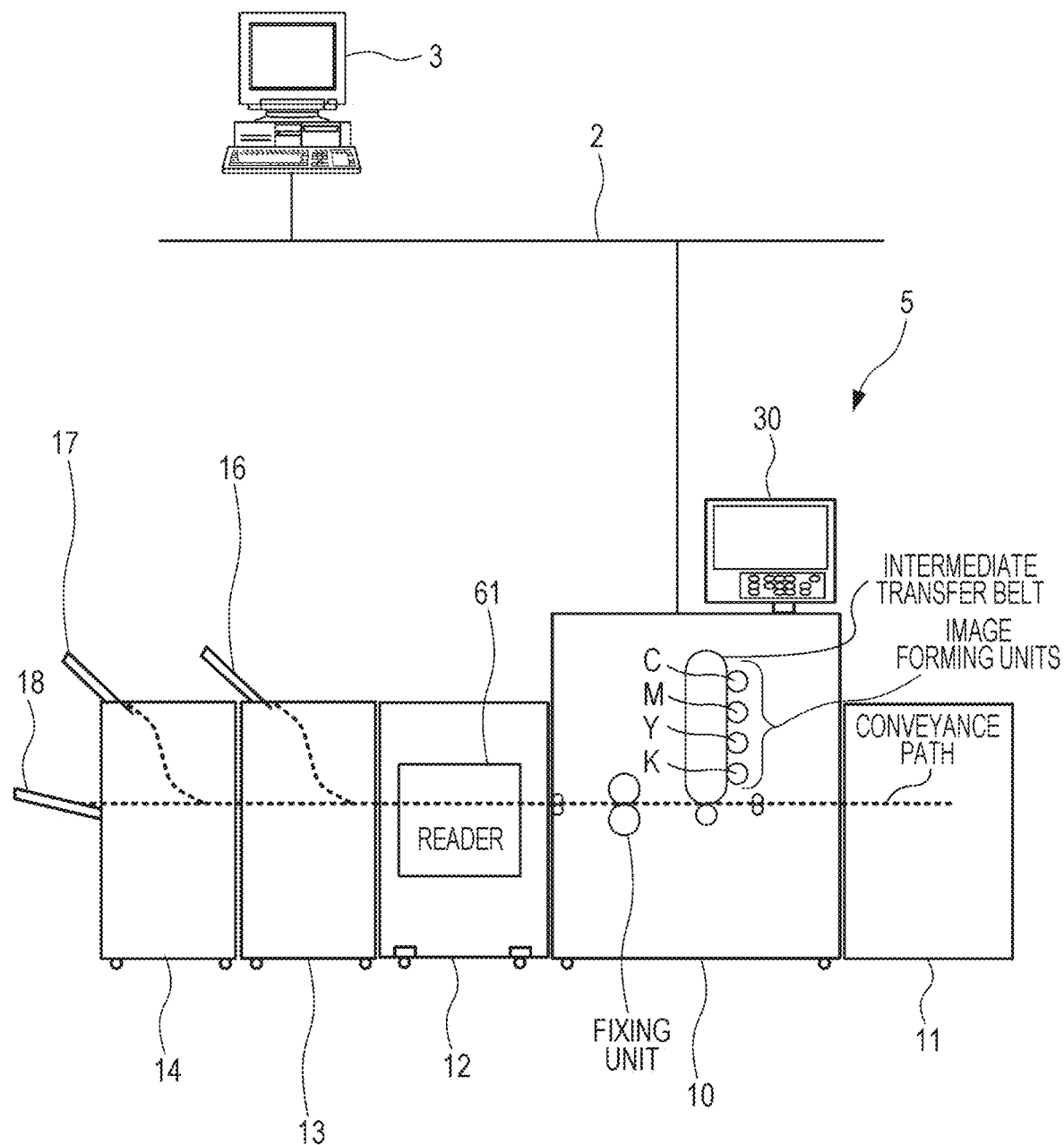
FIG. 1 is a diagram showing an image forming system according to an embodiment of the present invention.

FIG. 1 shows an image forming system 5 according to an embodiment of the present invention, and its connection environment. The image forming system 5 includes: an image forming apparatus main body 10 that receives print data from an external device, forms (prints) an image on a paper sheet on the basis of the print data, and outputs the image; a sheet feeding apparatus 11 that is connected to the front stage of the image forming apparatus main body 10, and feeds the image forming apparatus main body 10 with paper sheets; an image reading apparatus 12 that is connected to the subsequent stage of the image forming apparatus main body 10, and optically reads a paper sheet conveyed from the image forming apparatus main body 10; and a first sheet sorting apparatus 13 and a second sheet sorting apparatus 14 that are connected to the subsequent stage of the image reading apparatus 12, and switch sheet ejection destinations.

In the image forming system 5, the respective apparatuses mentioned above are connected in series, so that a conveyance path for conveying each paper sheet supplied from the sheet feeding apparatus 11 to a sheet ejection destination (the first sheet sorting apparatus 13 or the second sheet sorting apparatus 14) via the image forming apparatus main body 10 and the image reading apparatus 12 is formed in the image forming system 5.

The image forming apparatus main body 10 is communicably connected to an external terminal 3 such as a personal computer (PC) via a network 2 such as a local area network (LAN).

The image forming apparatus main body 10 includes an intermediate transfer belt that is endlessly looped, and image forming units of the respective colors C, M, Y, and K that are arranged along the intermediate transfer belt. The image forming units form a full-color toner image by superimposing C, M, Y, and K toner images on the intermediate transfer belt. The toner image formed on the intermediate transfer belt is then transferred onto a paper sheet supplied and conveyed from the sheet feeding apparatus 11, and further, is thermally fixed to the paper sheet by a fixing unit. After that, the paper sheet is sent to the image reading apparatus 12 in the subsequent stage. Note that the technique to be adopted by the image forming apparatus main body 10 to form an image on a paper sheet is not limited to the tandem electrophotographic technique described above, and may be any appropriate technique such as an inkjet technique.

The image reading apparatus 12 has a function to convey a paper sheet received from the image forming apparatus main body 10 to the first sheet sorting apparatus 13 in the subsequent stage thereof, and a function to acquire a read image by optically reading both surfaces of the paper sheet with a reader 61.

The first sheet sorting apparatus 13 functions as a switcher that switches between the ejection destination of a paper sheet conveyed from the image reading apparatus 12, between the second sheet sorting apparatus 14 in the subsequent stage and a first sub-tray 16 of the first sheet sorting apparatus 13. The second sheet sorting apparatus 14 is a switcher that switches the ejection destination of a paper sheet conveyed from the first sheet sorting apparatus 13, between a main tray 18 of the second sheet sorting apparatus 14 and a second sub-tray 17 of the second sheet sorting apparatus 14.

Figure 2:
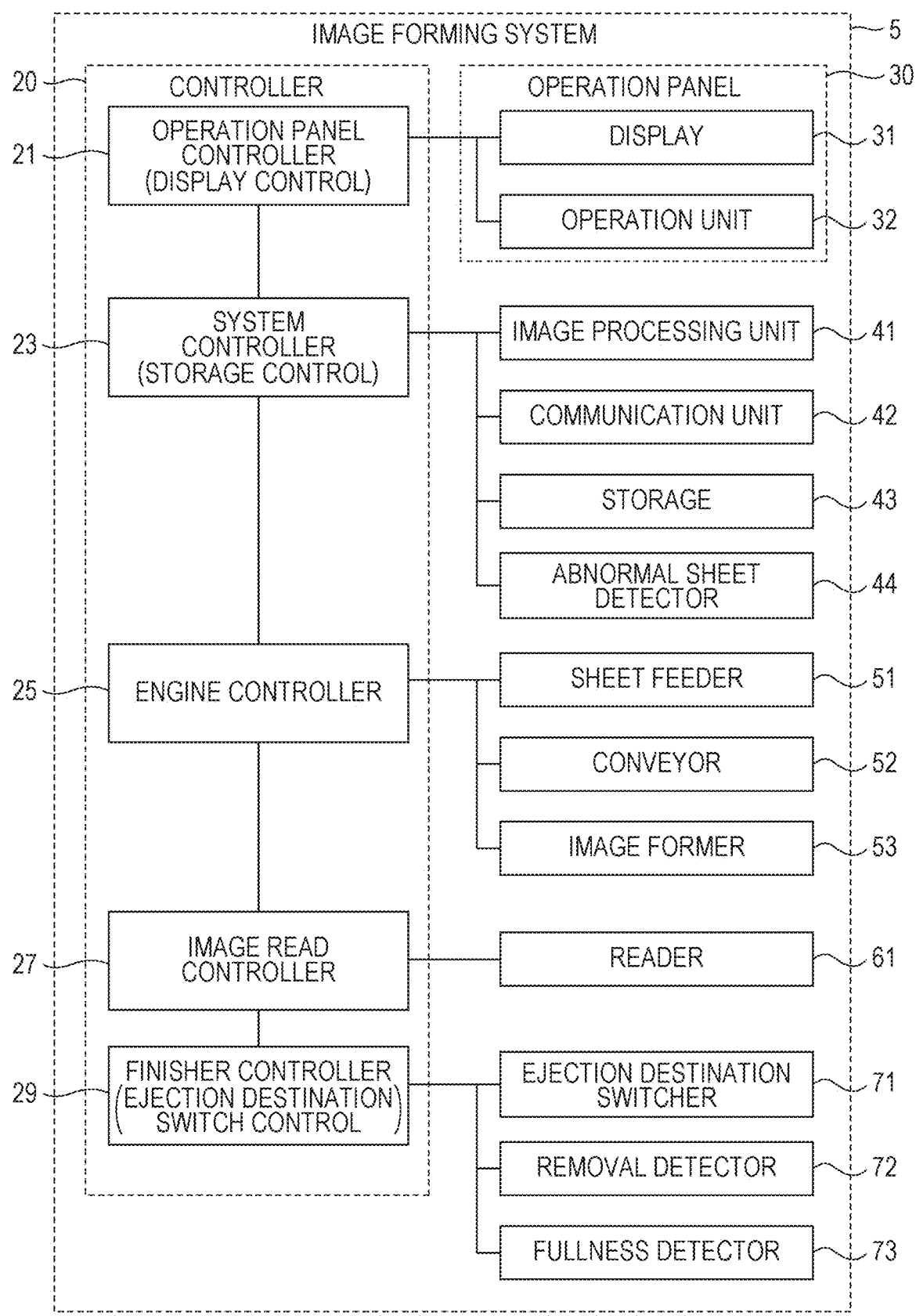
FIG. 2 is a block diagram schematically showing the electrical configuration of the image forming system.

FIG. 2 is a block diagram schematically showing the electrical configuration of the image forming system 5. The image forming system 5 includes a controller 20 that has a central processing unit (CPU), a read only memory (ROM), a random access memory (RAM), and the like as its principal components. Specifically, the controller 20 includes: an operation panel controller 21 that performs control relating to display and operation reception on an operation panel 30; a system controller 23 that performs overall control on operation of the entire image forming system 5; an engine controller 25 that controls sheet feeding/conveying/image forming operations in the sheet feeding apparatus 11 and the image forming apparatus main body 10; an image read controller 27 that controls reading operations in the image reading apparatus 12; and a finisher controller 29 that performs ejection destination switch control and the like in the first sheet sorting apparatus 13 and the second sheet sorting apparatus 14. Note that the system controller 23 comprehensively controls the operation panel controller 21, the engine controller 25, the image read controller 27, and the finisher controller 29.

A display 31 and an operation unit 32 of the operation panel 30 are connected to the operation panel controller 21. The display 31 is formed with a liquid crystal display or the like, and displays various kinds of operation screens and setting screens, sheet ejection information described later, and the like. The operation unit 32 is formed with a hardware switch and a touch screen provided on the screen of the display 31, and receives various kinds of user operations.

An image processing unit 41, a communication unit 42, a storage 43, an abnormality detector 44, and the like are connected to the system controller 23. The image processing unit 41 performs image processing such as enlargement/reduction and image correction on image data and the like, as well as a RIP process for decompressing and converting print data received from the external terminal 3 into image data. The communication unit 42 communicates with the external terminal 3 and a server or the like through the network 2, to transmit/receive various kinds of data.

The storage 43 stores information and read images about respective sheets ejected to a second ejection destination (the first sub-tray 16 or the second sub-tray 17) different from a regular ejection destination to which normal paper sheets are ejected, and other various kinds of information.

The abnormality detector 44 analyzes a read image obtained by the reader 61 optically reading a paper sheet, and determines whether the paper sheet is an abnormal paper sheet.

A sheet feeder 51, a conveyor 52, an image former 53, and the like are connected to the engine controller 25. In the image forming system 5 shown in FIG. 1, the sheet feeding apparatus 11 corresponds to the sheet feeder 51. Note that the image forming apparatus main body 10 may include a sheet feed tray, and the sheet feeder 51 that feeds paper sheets from the sheet feed tray. The conveyor 52 functions to convey paper sheets through the conveyance path in the image forming system 5, and includes conveyance rollers, a guide, and a motor that drives the conveyance rollers.

The image read controller 27 controls reading operations being performed by the reader 61 of the image reading apparatus 12.

The finisher controller 29 controls ejection destination switching operations and conveying operations in the first sheet sorting apparatus 13 and the second sheet sorting apparatus 14. An ejection destination switcher 71 that is an ejection destination switching mechanism, a removal detector 72 that detects removal of paper sheets from the first sub-tray 16 or the second sub-tray 17, and a fullness detector 73 that detects that the first sub-tray 16 or the second sub-tray 17 has reached its capacity, and the like are connected to the finisher controller 29.

The image forming system 5 optically reads a paper sheet output from the image forming apparatus main body 10 with the image reading apparatus 12, and analyzes the read image, to determine whether the paper sheet is an abnormal paper sheet (a wasted paper sheet). Abnormalities to be detected include stains, streaks, and spots. A spot is an abnormality such as density unevenness appearing in the form of a dot, and a streak is an image abnormality formed with spots appearing in a continuous line.

If the result of the above determination shows that the paper sheet is not an abnormal paper sheet, the paper sheet is ejected onto the main tray 18 that is a regular ejection destination. If the paper sheet is an abnormal paper sheet, the paper sheet and the succeeding paper sheets are ejected to a second ejection destination (the first sub-tray 16 or the second sub-tray 17) different from the regular ejection destination. The succeeding paper sheets include at least all the sheets that have already been fed into the apparatus and are in the conveyance path in the apparatus when an abnormal paper sheet is detected.

A second ejection destination is an ejection destination that is set beforehand as an ejection destination for abnormal paper sheets and their succeeding paper sheets. In a case where there is a plurality of second ejection destinations, the ejection destination to which abnormal paper sheets and the succeeding paper sheets are to be actually ejected is selected automatically or in accordance with a user instruction.

Figure 3:
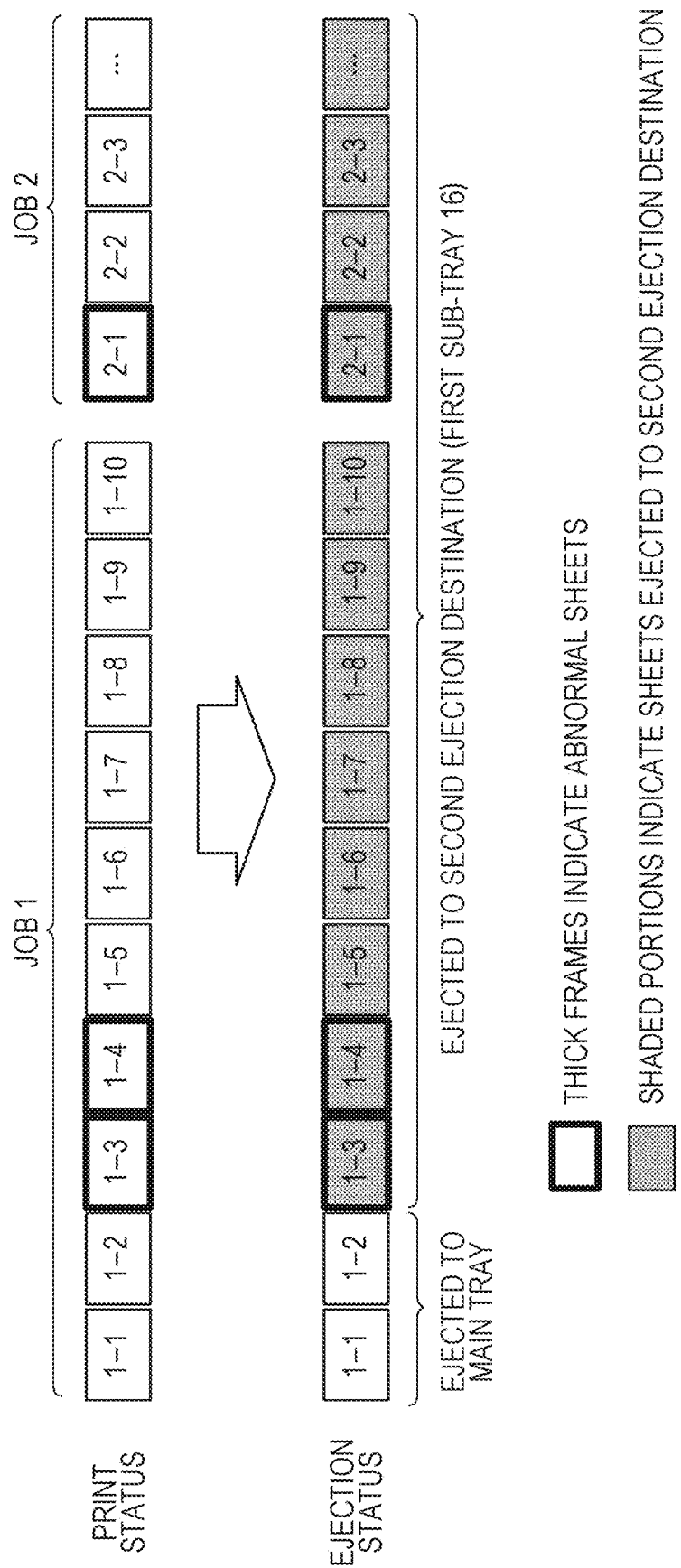
FIG. 3 is a diagram showing an example of an operation in which an abnormal paper sheet and the succeeding paper sheets are ejected to a second ejection destination in the image forming system.

FIG. 3 shows an example of an operation in which abnormal paper sheets and the succeeding paper sheets are ejected to a second ejection destination in the image forming system 5. This example shows a case where abnormalities have been detected in the third paper sheet (1-3) and the fourth paper sheet (1-4) in Job 1 of ten paper sheets in total, and an abnormality has been further detected in the first paper sheet (2-1) in Job 2, which follows Job 1.

The first paper sheet (1-1) and the second paper sheet (1-2) of Job 1 are ejected to the main tray 18, which is the regular ejection destination. The third paper sheet (1-3) and the fourth paper sheet (1-4), which are abnormal paper sheets, of Job 1 are ejected to a second ejection destination (the first sub-tray 16, for example), and the succeeding paper sheets (1-5 through 1-10) are also ejected to the second ejection destination. Further, the first paper sheet (2-1), which is an abnormal paper sheet, of Job 2 and the succeeding paper sheets (2-2, 2-3, . . . ) are also ejected to the second ejection destination.

As described above, when abnormal paper sheets and the succeeding paper sheets are ejected to the same second ejection destination, it is difficult to determine which of the many paper sheets stacked at the second ejection destination is the target abnormal paper sheet, and remove the target abnormal paper sheet. For example, even if only information about the abnormal paper sheet is shown on the display, such information is not enough to give aid (a clue) in finding the abnormal paper sheet from the second ejection destination.

Therefore, in the image forming system 5 according to this embodiment, every time a paper sheet is ejected to a second ejection destination, sheet information indicating whether the paper sheet is an abnormal paper sheet, and sheet ejection information associating a read image of the paper sheet with the stacking order of the paper sheet at the second ejection destination is stored into the storage 43. That is, for each of the abnormal paper sheets and the succeeding paper sheets, the sheet information, the stacking order, and a read image are associated with one another, and are stored into the storage 43.

In the image forming system 5, when the user removes an abnormal paper sheet from a second ejection destination, sheet ejection information including a read image is provided not only for the abnormal paper sheet but also for each succeeding paper sheet. Because of this, as long as a characteristic image has been printed on the succeeding paper sheet that follows the abnormal paper sheet, the user can find the succeeding paper sheet from among the many paper sheets stacked at the second ejection destination on the basis of the characteristic image, after displaying a read image of the succeeding paper sheet on the operation panel 30 and checking the read image. As a result, the abnormal paper sheet immediately below the succeeding paper sheet can be readily identified and removed.

Figure 4:
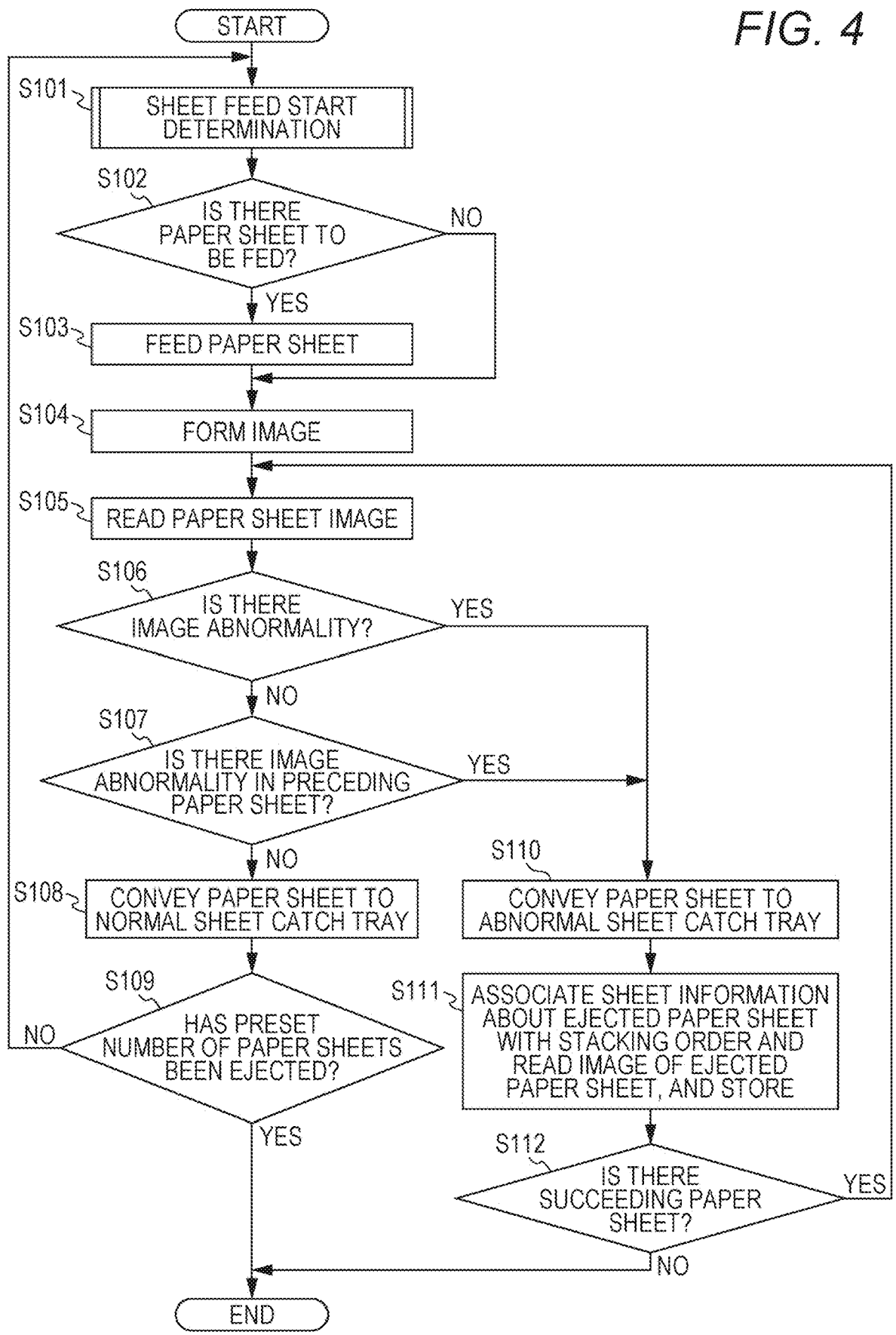
FIG. 4 is a flowchart schematically showing the operation of the image forming system at a time of printing.

FIG. 4 is a flowchart showing an outline of an operation to be performed by the image forming system 5 at a time of printing. First, the controller 20 performs a sheet feed start determination process to determine whether to feed the next paper sheet (step S101).

Figure 5:
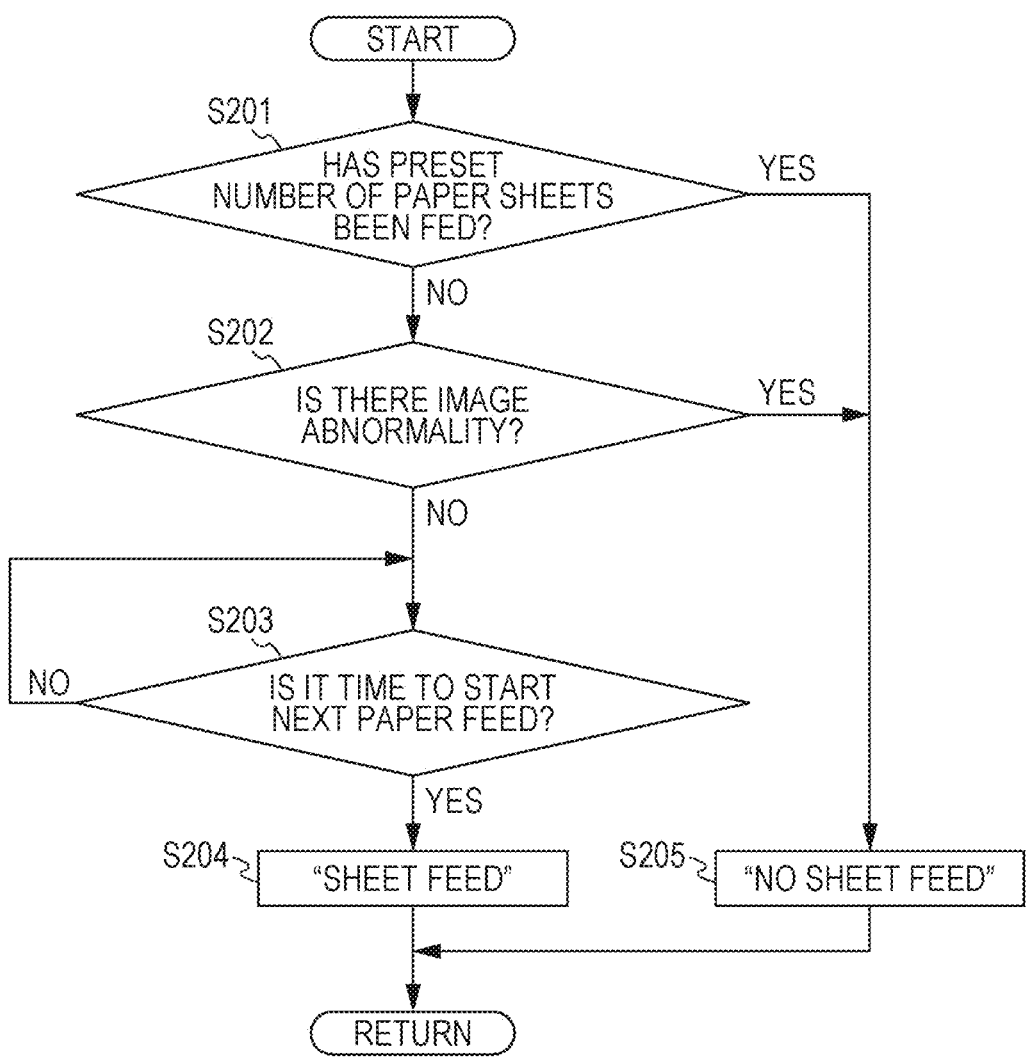
FIG. 5 is a flowchart showing a sheet feed start determination process (step S101 in FIG. 4) in detail.

FIG. 5 shows the sheet feed start determination process (step S101 in FIG. 4) in detail. If a preset number of paper sheets has been fed (step S201; Yes), "no sheet feed" is set as the return value (step S205), and this process is ended.

If the preset number of paper sheets has not been fed (step S101; No), a check is made to determine whether there is an abnormal paper sheet (a paper sheet from which an image abnormality has been detected) among the preceding paper sheets (step S202). If there is an abnormal paper sheet among the preceding paper sheets (step S202; Yes), "no sheet feed" is set as the return value (step S205), and this process is ended.

If there are no abnormal paper sheets among the preceding paper sheets (step S202; No), the controller 20 waits for the next sheet feed start time (step S203; No). When the next sheet feed start time comes (step S203; Yes), "sheet feed" is set as the return value (step S204), and this process is ended.

In step S102 in FIG. 4, a check is made to determine whether the return value of the sheet feed start determination process (step S101) is "sheet feed" (step S102). If the return value is "sheet feed" (step S102; Yes), a new paper sheet is fed (step S103), and the process moves on to step S104. If the return value is "no sheet feed" (step S102; No), any new paper sheet is not fed, and the process moves on to step S104.

The image former 53 of the image forming apparatus main body 10 forms an image on the paper sheet conveyed to the image former 53 (step S103). The image reading apparatus 12 reads an image of the paper sheet conveyed from the image forming apparatus main body 10 (step S105). The abnormality detector 44 of the system controller 23 then analyzes the read image, and determines whether the paper sheet corresponding to the read image is an abnormal paper sheet (having an image abnormality) (step S106).

If the paper sheet is not an abnormal paper sheet (step S106; No), a check is made to determine whether there is an abnormal paper sheet (a paper sheet from which an image abnormality has been detected) among the preceding paper sheets (step S107). If there are no abnormal paper sheets among the preceding paper sheets (step S107; No), the paper sheet is conveyed to the main tray 18 (the regular ejection destination) that is an ejection destination for normal paper sheets (step S108). After this paper sheet ejection, a check is made to determine whether a preset number of paper sheets has been ejected (step S109). If the preset number of paper sheets has been ejected (step S109; Yes), this process is ended. If the preset number of paper sheets has not been ejected (step S109; No), the process returns to step S101 and continues.

If the result of the read image analysis conducted by the abnormality detector 44 shows that the paper sheet corresponding to the read image is an abnormal paper sheet having an image abnormality (step S106; Yes), or if this paper sheet is not an abnormal paper sheet (step S106; No) but there is an abnormal paper sheet among the preceding paper sheets (step S107; Yes), the paper sheet is conveyed to a second ejection destination (the first sub-tray 16 or the second sub-tray 17) different from the regular ejection destination (step S110, sheet ejection destination switch control). Sheet ejection information that associates the sheet information about this paper sheet ejected to the second ejection destination, the stacking order of the paper sheet at the ejection destination, and the read image of the paper sheet with one another is then stored into the storage 43 (step S111, storage control).

If there are no succeeding paper sheets after this paper sheet (step S112; No), this process is ended. If there is a succeeding paper sheet (step S112; Yes), the process returns to step S105 and continues.

Through the above process, the paper sheets (normal paper sheets) before the abnormal paper sheet are ejected to the regular ejection destination. The abnormal paper sheet and the succeeding paper sheets are ejected to the second ejection destination, and the sheet ejection information that associates the sheet information about the paper sheets, the stacking order of the paper sheets at the second ejection destination, and the read images of the paper sheets with one another is stored into the storage 43. Here, all the succeeding paper sheets to be ejected to the second ejection destination are read by the reader 61, and the sheet ejection information about the succeeding paper sheets is stored, even if no images are formed by the image former 53. Note that the sheet ejection information to be stored into the storage 43 may be not about all the succeeding paper sheets but about a predetermined number of succeeding paper sheets following the abnormal paper sheet.

FIG. 6 shows an example of a sheet ejection information table 80 in which the sheet ejection information for each paper sheet ejected to the second ejection destination is registered. In the sheet ejection information table 80, the ejection destination (the first sub-tray 16 or the second sub-tray 17) of each paper sheet, the stacking order of the paper sheet at the ejection destination, the sheet information about the paper sheet, and a read image of the paper sheet are associated with one another and are stored as the sheet ejection information about each of the paper sheets ejected to the second ejection destination.

Specifically, the stored sheet information includes information indicating whether the paper sheet is an abnormal paper sheet (for example, information indicating whether the paper sheet is an abnormal paper sheet, a succeeding paper sheet, or an adjustment sheet (a test chart)), the date and time of the ejection, the job name, the page number in the job, the cause of the abnormality, and the sheet feed tray number. Note that actual read images may be registered in the sheet ejection information table 80. In this example, however, actual read images are stored at a different location from the sheet ejection information table 80, and the storage location (the address, the path name, the file name, and the like) of the read images are registered in the sheet ejection information table 80.

FIG. 7 is a flowchart showing a process of displaying the sheet ejection information about the paper sheets ejected to a second sheet catch tray. If the image forming system 5 receives a sheet ejection information display instruction from the user through the operation panel 30 or the like (step S301; Yes), or if the fullness detector 73 detects that the second ejection destination has reached its capacity (step S302; Yes), display control is performed so that information about the paper sheets ejected to the second sheet catch tray is displayed (step S303).

In the description below, various example modes of the confirmation screen for displaying the sheet ejection information will be described.

<List Display Format>

FIG. 8 shows an example of a sheet ejection information list 90 that displays (lists) the sheet ejection information about the paper sheets ejected to a second ejection destination in a list format. The sheet ejection information list 90 is displayed on part of the confirmation screen. One row in the sheet ejection information list 90 shows the sheet ejection information about one paper sheet. For each paper sheet, the sheet ejection information list 90 displays an icon for giving an instruction to display the information indicating whether the paper sheet is an abnormal paper sheet or a succeeding paper sheet, the name of the sheet catch tray (the first sub-tray 16 in this example) at the sheet ejection destination, the stacking order at the sheet ejection destination, the date and time of the ejection, the job name, the page number in the job, the cause of the abnormality, and a read image. When the icon is pressed with a finger or the like, a read image of the paper sheet is displayed on a pop-up screen or the like.

The user can recognize the stacking order of an abnormal paper sheet from the information displayed in the sheet ejection information list 90, and easily compare and check the read image of the abnormal paper sheet with the read image of the succeeding paper sheet stacked immediately after the abnormal paper sheet, by pressing an appropriate icon.

<Page Turning Format>

The sheet ejection information of the paper sheets ejected to a second ejection destination is displayed on a sheet-by-sheet basis. FIG. 9 shows an example of a confirmation screen (a page-by-page screen 92) that displays the sheet ejection information in a page turning format. A read image of a page is displayed in the center of the screen, and the sheet ejection information other than the read image of the page is listed and displayed below the read image. When a previous-page button 93 on the left side of the read image is pressed, the display target is switched to the previous paper sheet in the stacking order. When a next-page button 94 on the right side of the read image is pressed, the display target is switched to the next paper sheet in the stacking order.

Figure 10:
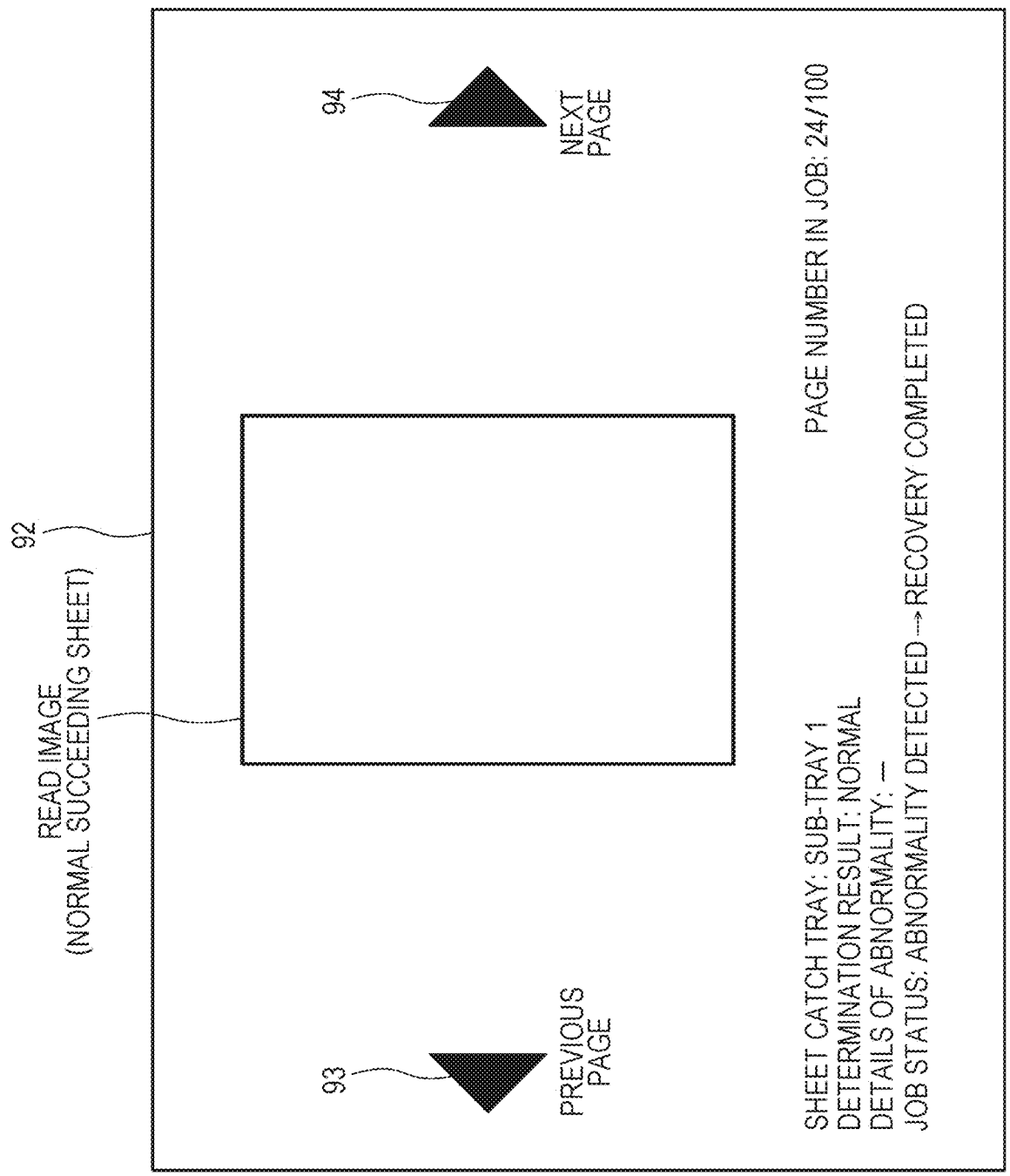
FIG. 10 is a diagram showing an example of the page-by-page screen on which the display target has been switched to the next page from the display target shown in FIG. 9.

FIG. 9 shows a case where the display target is an abnormal paper sheet. In FIG. 9, the abnormal portion is emphasized with hatching or the like. As a result, the user can easily recognize at which portion of the paper sheet an abnormality has occurred. Further, the user can recognize the overlapping relationship between the abnormal paper sheet and the preceding and succeeding paper sheets by operating the previous-page button 93 and the next-page button 94. Thus, the user can easily find the target abnormal paper sheet among the paper sheets stacked at the second ejection destination. For example, when the next-page button 94 is pressed in the state shown in FIG. 9, the display content of the page-by-page screen 92 is switched to that shown in FIG. 10. FIG. 10 shows the sheet ejection information about the succeeding paper sheet (a normal paper sheet) ejected to the second ejection destination immediately after the abnormal paper sheet.

<Thumbnail Format>

Figure 11:
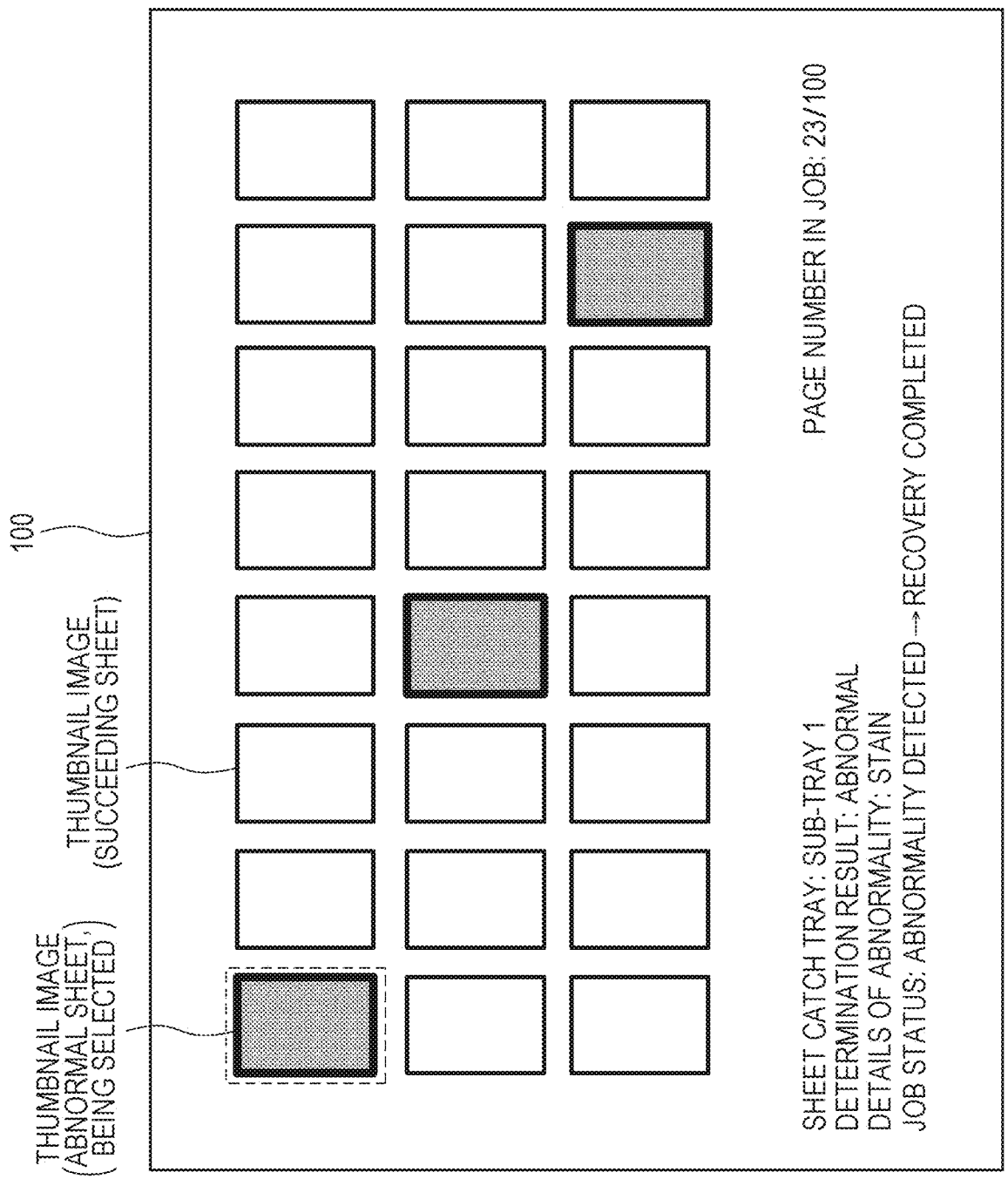
FIG. 11 is a diagram showing an example of a thumbnail confirmation screen (a thumbnail screen)

FIG. 11 shows an example of a thumbnail confirmation screen (a thumbnail screen 100) that displays reduced read images (thumbnail images) of paper sheets ejected to a second ejection destination in the stacking order. The thumbnail image of each abnormal paper sheet is emphasized by the addition of a thick frame and hatching or the like (in the color of gray accompanied by a thick frame in the drawing). By pressing any desired one of the listed thumbnail images, the user can select the paper sheet corresponding to the thumbnail image. At a lower portion of the thumbnail screen 100, the sheet ejection information about the read images other than the read image of the paper sheet corresponding to the selected thumbnail image is displayed. In FIG. 11, a dashed line surrounding the outer periphery of the currently selected thumbnail image is displayed.

The user can recognize the overlapping relationship between the abnormal paper sheet and the preceding and succeeding paper sheets by viewing the thumbnail images arranged in the stacking order on the thumbnail screen 100. Thus, the user can easily find the target abnormal paper sheet among the paper sheets stacked at the second ejection destination.

Figure 12:
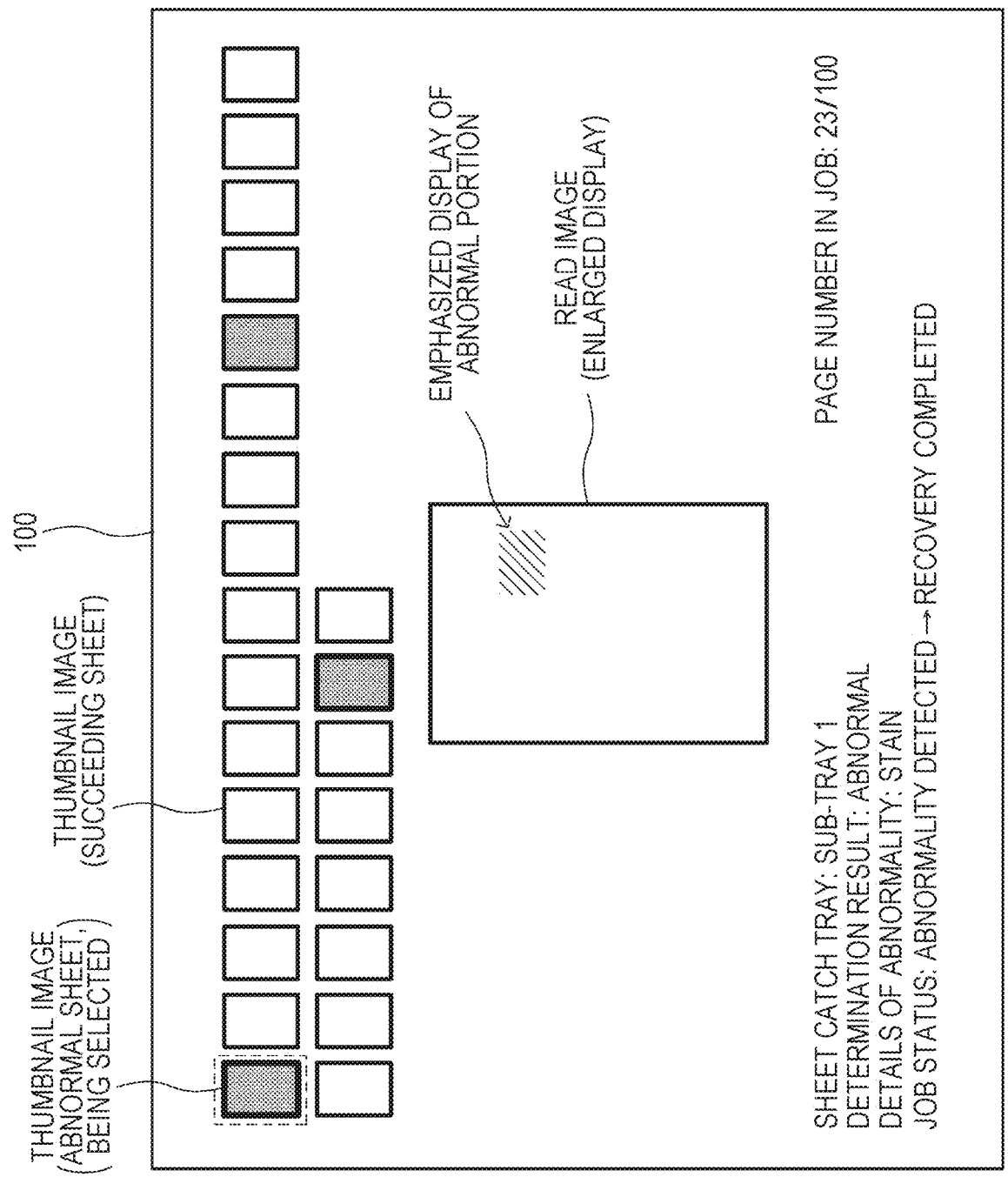
FIG. 12 is a diagram showing an example of the thumbnail screen in which a read image of a selected paper sheet is enlarged.

Further, an operation such as a press-and-hold operation is performed on a desired thumbnail image on the thumbnail screen 100, so that the read image of the paper sheet corresponding to the thumbnail image can be displayed in an enlarged manner as shown in FIG. 12.

<Job-by-Job Thumbnail Format>

Figure 13:
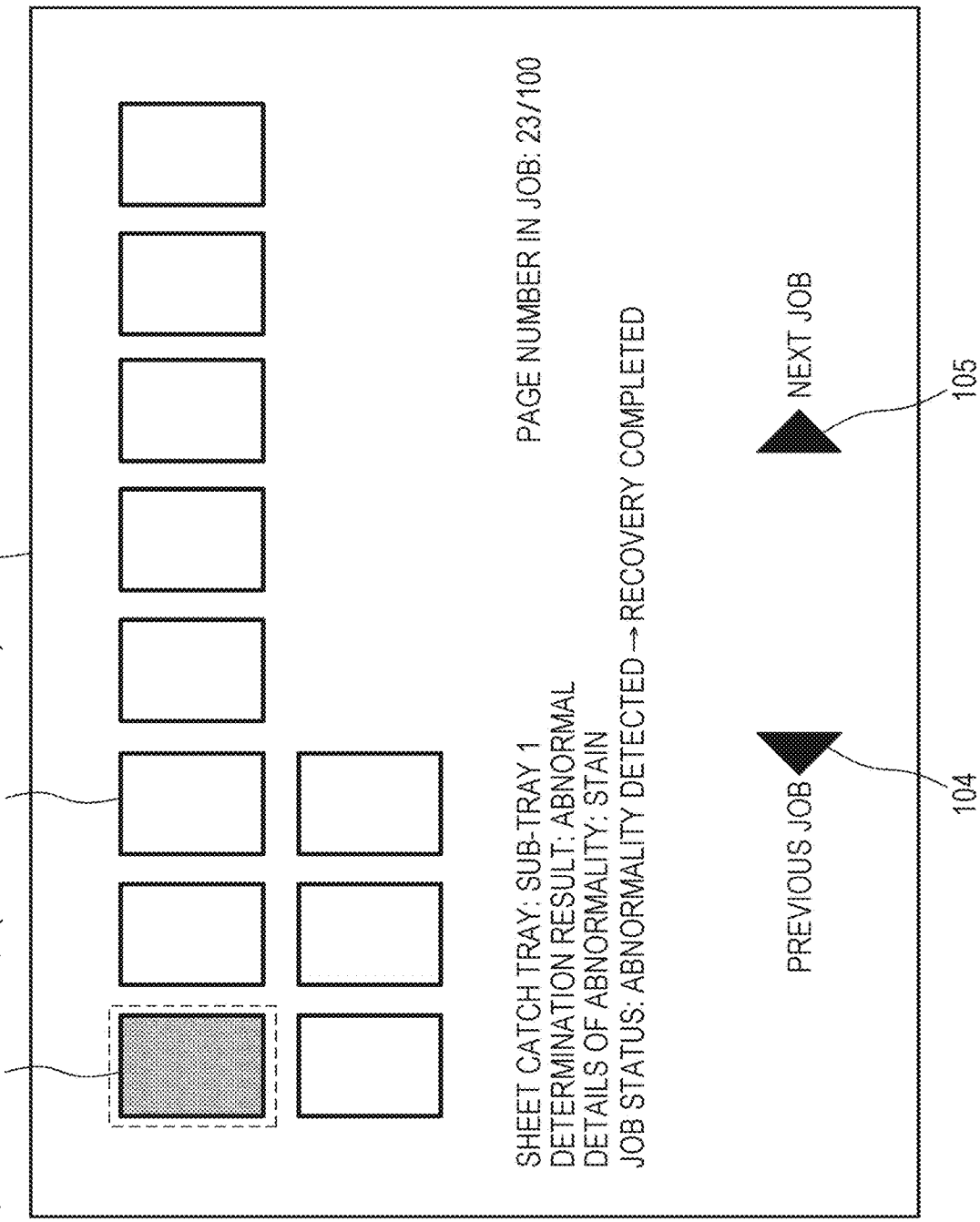
FIG. 13 is a diagram showing an example of a job-by-job thumbnail screen.

FIG. 13 shows an example of a confirmation screen (a job-by-job thumbnail screen 103) that displays thumbnail images of paper sheets ejected to a second ejection destination in the stacking order on a job-by-job basis. The job-by-job thumbnail screen 103 lists and displays only the thumbnail images of an abnormal paper sheet and the succeeding paper sheets related to a desired job in a case where abnormal paper sheets and the succeeding paper sheets of a plurality of jobs have been ejected to a second ejection destination. When a previous job button 104 at a lower portion of the screen is pressed, the display target job is switched to the previous job in the stacking order. When a next-job button 105 is pressed, the display target job is switched to the next job in the stacking order.

On the job-by-job thumbnail screen 103 shown in FIG. 13, the thumbnail image of the abnormal paper sheet is emphasized by the addition of a thick frame and hatching or the like, as in the example shown in FIG. 11. By pressing any desired one of the listed thumbnail images, the user can select the paper sheet corresponding to the thumbnail image. The sheet ejection information about the read images other than the read image of the paper sheet corresponding to the selected thumbnail image is then displayed on the job-by-job thumbnail screen 103. A dashed line surrounding the outer periphery of the currently selected thumbnail image is also displayed.

In a case where the paper sheets related to a plurality of jobs have been ejected to the second ejection destination, whether to display the sheet ejection information on a job-by-job basis on the confirmation screen is determined in accordance with a select operation input from the user.

Sheet Ejection of an Adjustment Chart

In the above described examples, the paper sheets to be ejected to a second ejection destination are abnormal paper sheets and the succeeding paper sheets. However, the paper sheets to be ejected to a second ejection destination may include an adjustment chart or the like. Specifically, as well as abnormal paper sheets and the succeeding paper sheets, a test chart (an adjustment chart) that is output in an adjustment mode is ejected to a second ejection destination. The image forming system 5 also reads an image of the adjustment chart to be ejected to a second ejection destination with the image reading apparatus 12, creates sheet ejection information, and stores the sheet ejection information into the storage 43. That is, when the adjustment chart is ejected to a second ejection destination, sheet ejection information that associates information indicating that the ejected paper sheet is the adjustment chart, the stacking order of this paper sheet at the second ejection destination, and the read image of this paper sheet with one another is stored into the storage 43.

Figure 14:
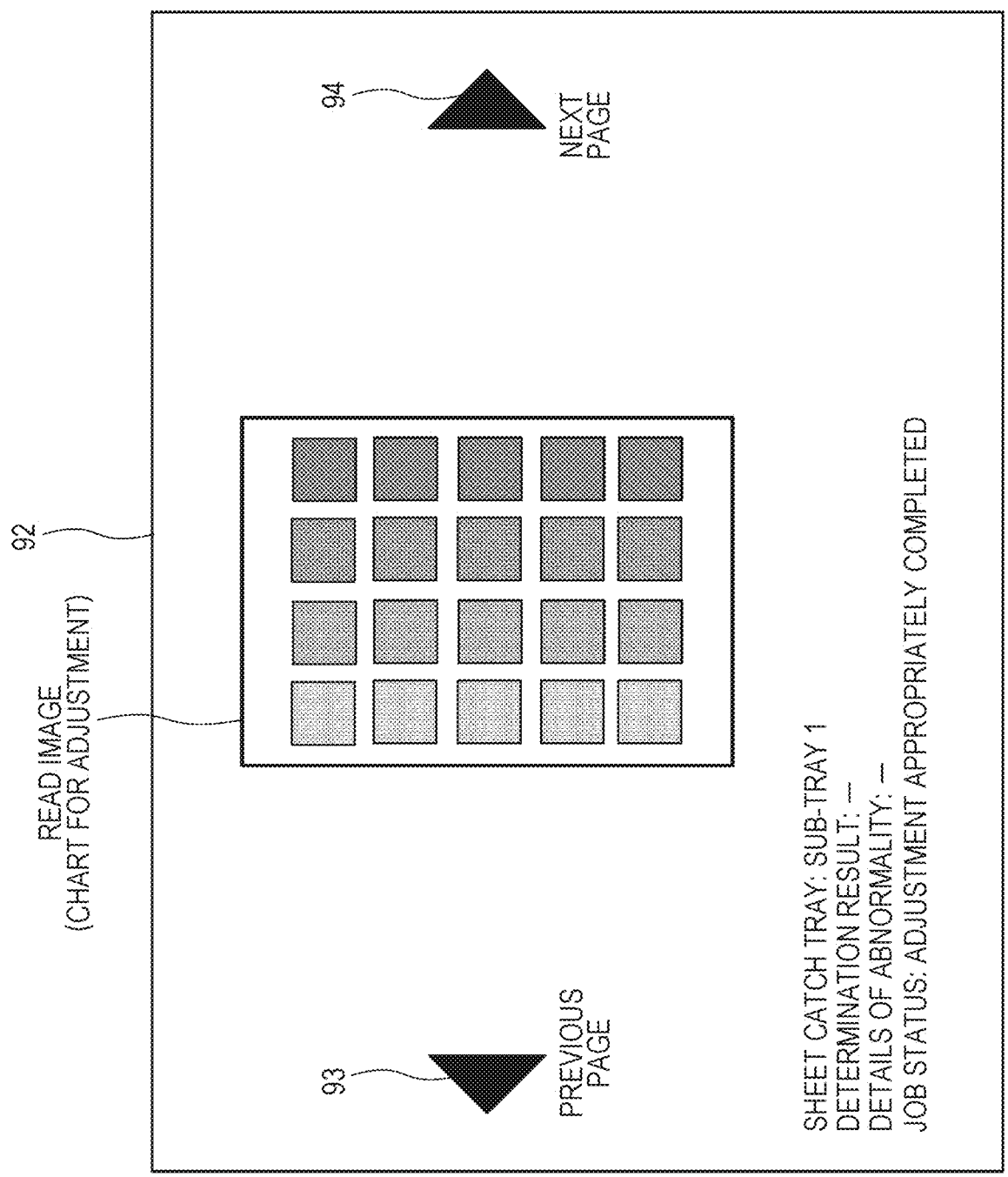
FIG. 14 is a diagram showing an example of a page-by-page screen displaying an adjustment chart.

When displaying the sheet ejection information about paper sheets ejected to a second ejection destination on a confirmation screen in the list format, the page turning format, or the thumbnail format, the image forming system 5 displays the sheet ejection information in the stacking order, including the adjustment chart. Because of this, the user can recognize the overlapping relationship among an abnormal paper sheet, the preceding and succeeding paper sheets, and the adjustment chart, and easily find the target abnormal paper sheet among the paper sheets stacked at the second ejection destination. FIG. 14 shows an example state in which the sheet ejection information about the adjustment chart is displayed on the page-by-page screen 92 that displays sheet ejection information in the page turning format.

In a case where there is a plurality of sheet catch trays that can serve as second ejection destinations, the image forming system 5 can display sheet ejection information for each sheet catch tray on the confirmation screen. In the case of the image forming system 5 shown in FIG. 1, the first sub-tray 16 and the second sub-tray 17 are sheet catch trays that can serve as second ejection destinations. When the second ejection destination is switched to a plurality of sheet catch trays in ejection destination switch control, the image forming system 5 displays sheet ejection information about each of the sheet catch trays to which the second ejection destination is switched.

Figure 15:
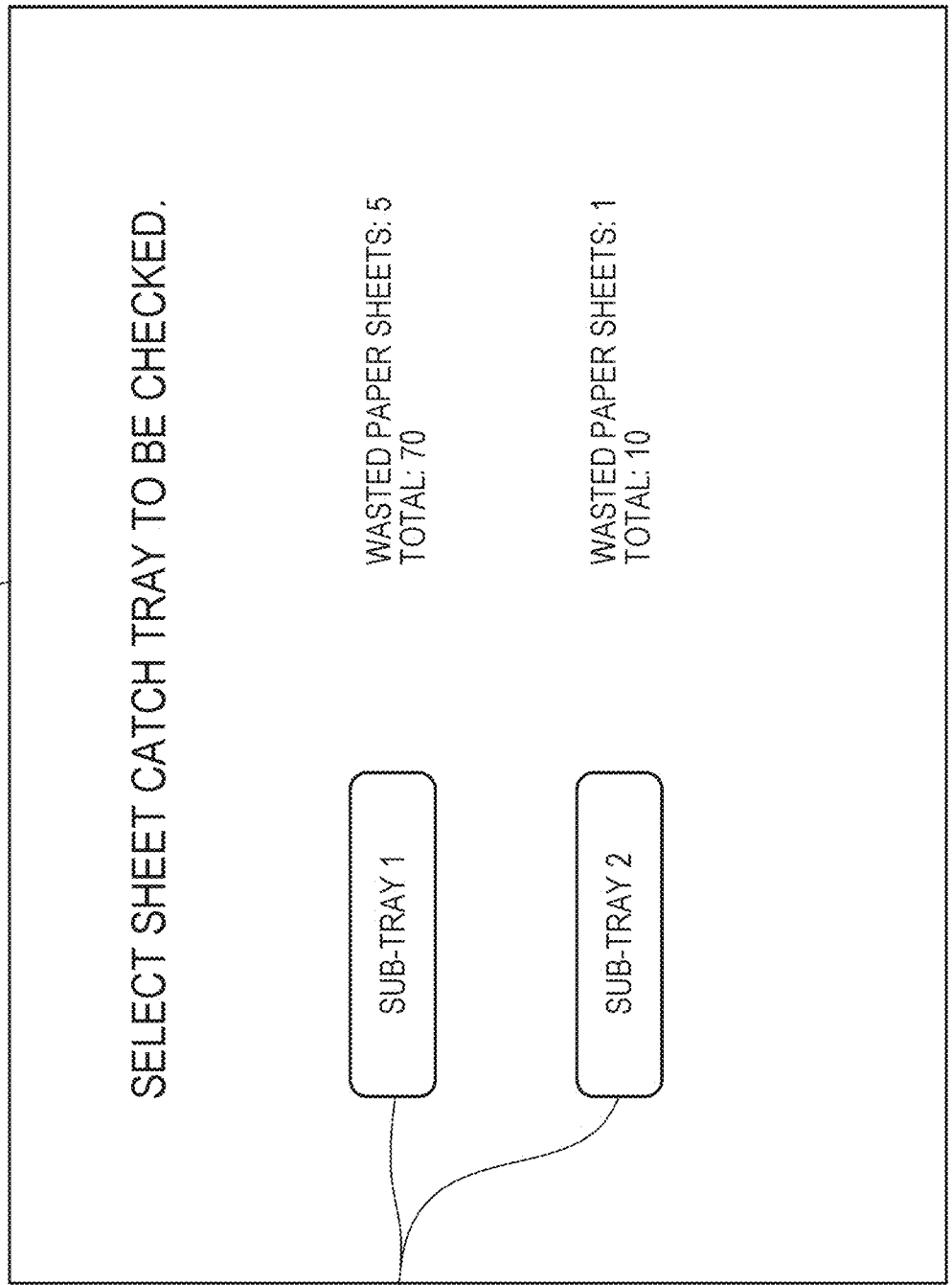
FIG. 15 is a diagram showing an example of a confirmation sheet catch tray select screen.

FIG. 15 shows an example of a confirmation sheet catch tray select screen 110 that receives, from the user, an operation to select a sheet catch tray about which sheet ejection information is to be displayed. The confirmation sheet catch tray select screen 110 is displayed in a case where the second ejection destination is switched to a plurality of sheet catch trays during a sheet ejecting operation.

For example, when a sub-tray 1 is selected with a sub-tray select button 112 in the confirmation sheet catch tray select screen 110, the image forming system 5 extracts only the sheet ejection information about the paper sheets ejected to the first sub-tray 16 out of the sheet ejection information stored in the storage 43, and displays the extracted sheet ejection information in the sheet ejection information list 90 or on a confirmation screen such as the page-by-page screen 92 or the thumbnail screen 100.

Next, a confirmation screen for two-sided printing is described.

Figure 16:
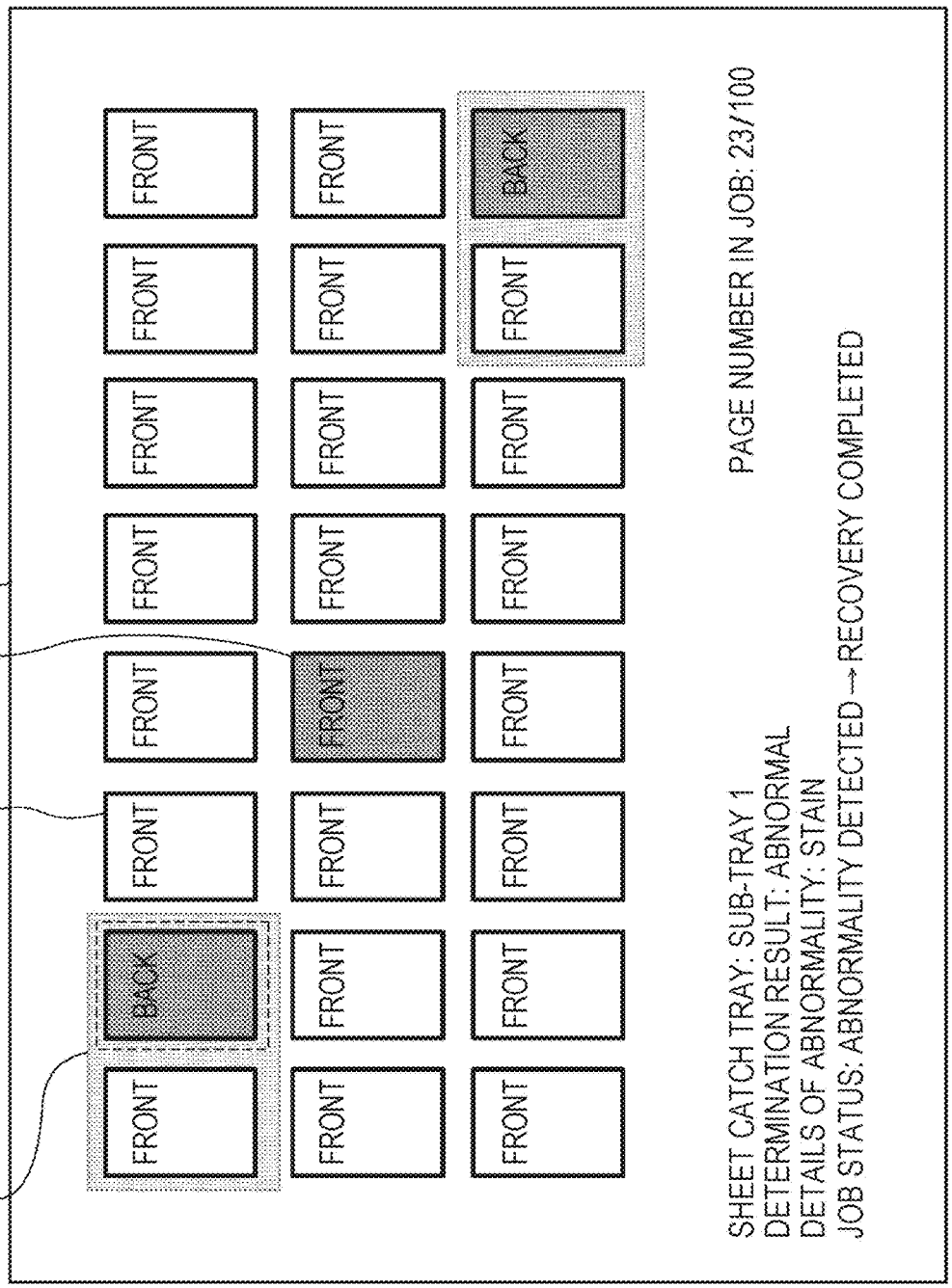
FIG. 16 is a diagram showing an example of a thumbnail screen at a time of two-sided printing.

When two-sided printing is performed, an image abnormality might appear on the back side of a paper sheet. In this case, the user wishes to check a read image of the back side having the image abnormality on a confirmation screen. As for each succeeding paper sheet, on the other hand, it is not necessary to check the back side, as long as the overlapping relationship with the abnormal paper sheet is clear. Therefore, for each abnormal paper sheet having an image abnormality on its back side, read images of the front and back sides are displayed on the confirmation screen. For each of the other paper sheets (abnormal paper sheets each having an image abnormality only on its front side, and the succeeding paper sheets), only a read image of the front side is displayed on the confirmation screen. FIG. 16 shows an example of the thumbnail screen 100 at a time of two-sided printing.

Figure 17:
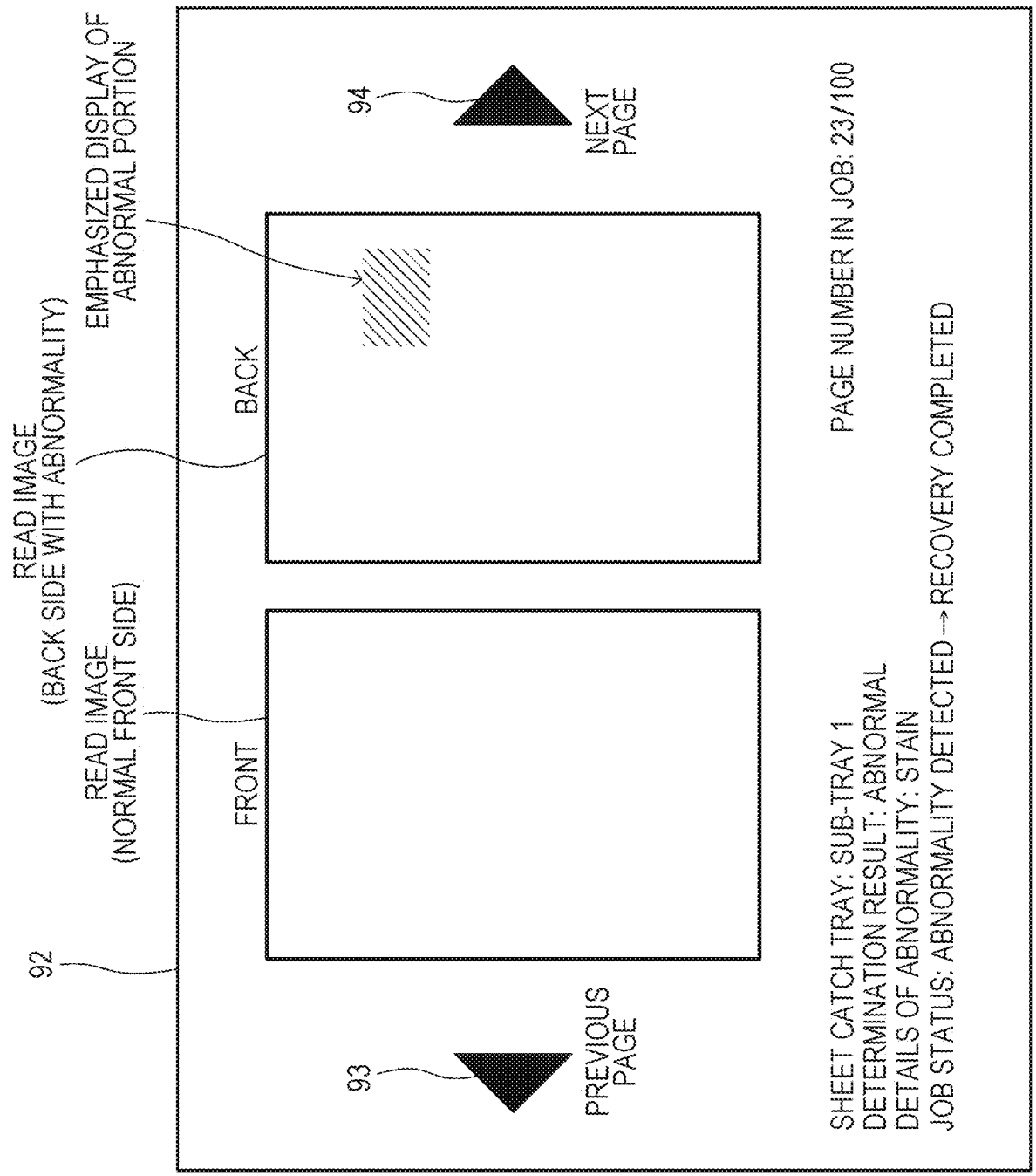
FIG. 17 is a diagram showing an example of a page-by-page screen at a time of two-sided printing in a case where sheet ejection information about an abnormal paper sheet having a normal front side and an abnormal back side is displayed.
Figure 18:
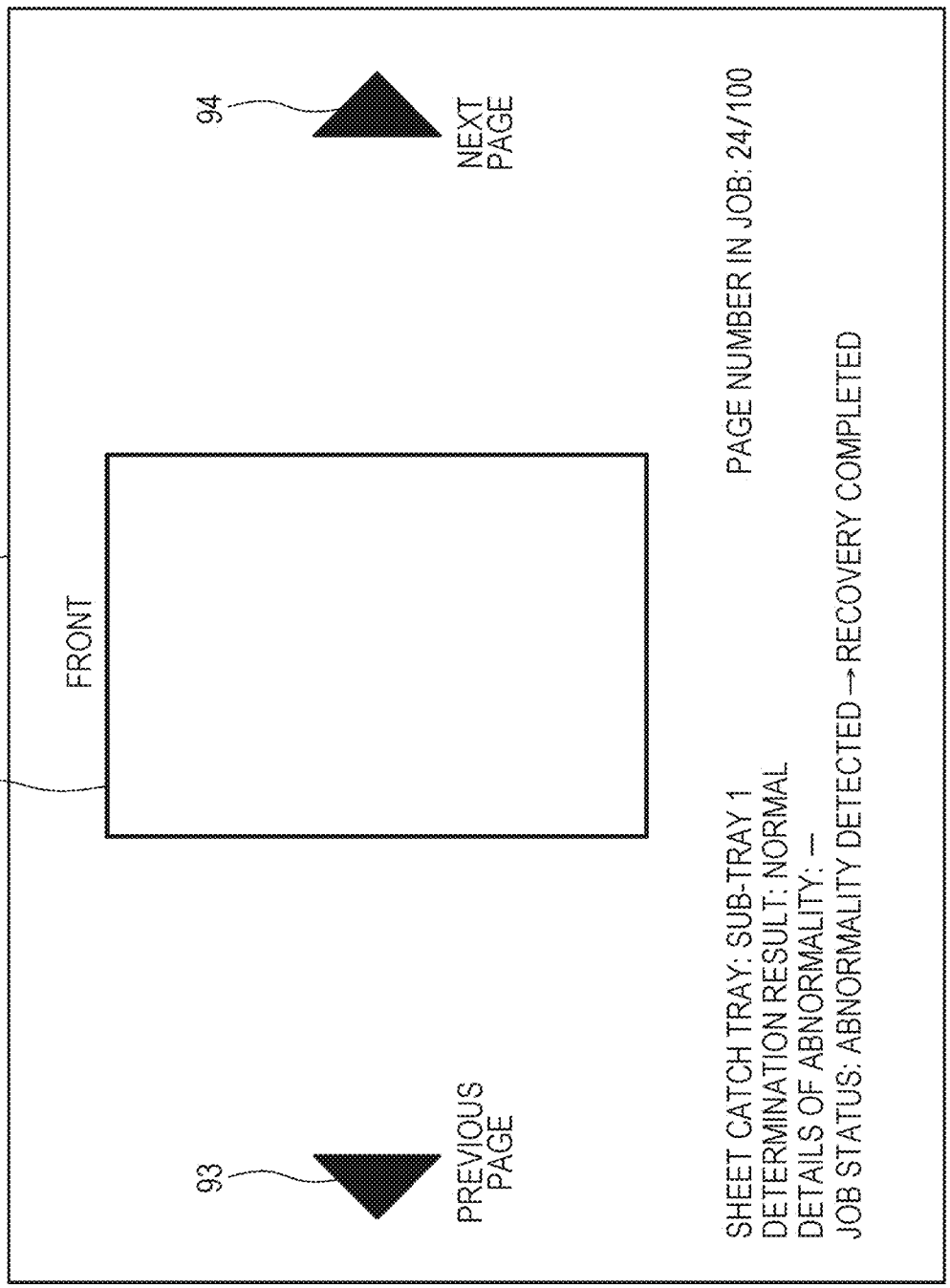
FIG. 18 is a diagram showing an example of a page-by-page screen at a time of two-sided printing in a case where sheet ejection information about a succeeding paper sheet is displayed.

FIG. 17 shows an example of the page-by-page screen 92 at a time of two-sided printing in a case where the sheet ejection information about an abnormal paper sheet having a normal front side and an abnormal back side is displayed. In this case, both read images of the front side and the back side are displayed on the page-by-page screen 92. FIG. 18 shows an example of the page-by-page screen 92 at a time of two-sided printing in a case where the sheet ejection information about a succeeding paper sheet is displayed. In this case, only a read image of the front side is displayed.

Figure 19:
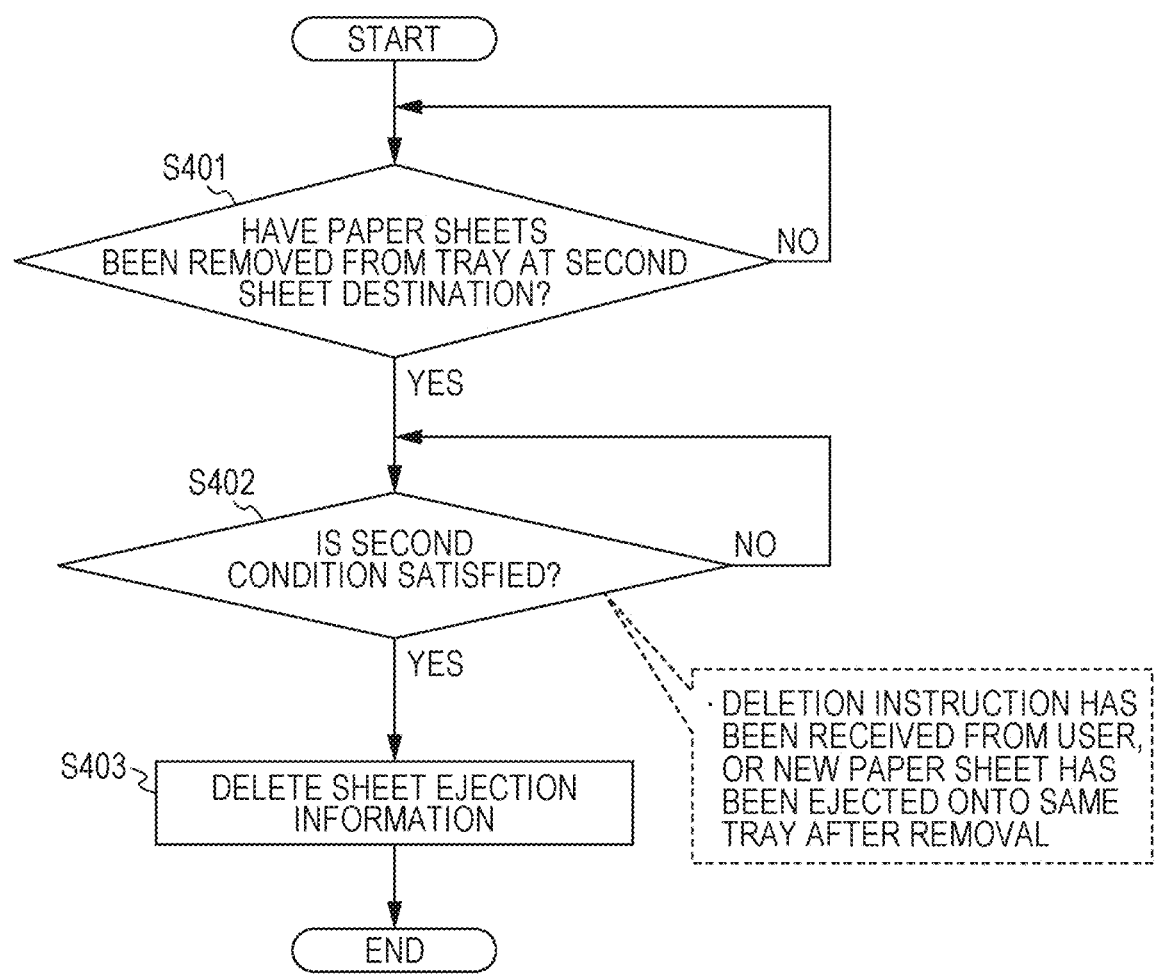
FIG. 19 is a flowchart showing a process of deleting sheet ejection information.

FIG. 19 is a flowchart showing a process of deleting sheet ejection information stored in the storage 43. The controller 20 of the image forming system 5 monitors the detection value of the removal detector 72 that determines whether stacked paper sheets have been removed from a sheet catch tray that is a second ejection destination (step S401; No). If paper sheet removal is detected (step S401; Yes), the controller 20 waits until a second condition that is a predetermined weighting requirement is satisfied (step S402; No).

The second condition is satisfied when an instruction or an operation for deleting sheet ejection information is received from the user, when the image forming system 5 ejects a new paper sheet to the second ejection destination from which paper sheet removal has been detected, or when new printing is started after detection of paper sheet removal.

If the second condition is satisfied (step S402; Yes), the sheet ejection information relating to the sheet ejection destination from which the paper sheet removal has been detected is deleted from the storage 43 (step S403).

Normally, the user removes all the paper sheets stacked at the second ejection destination from the second ejection destination, and places the removed paper sheets at hand, before performing an operation to identify an abnormal paper sheet by comparing the read images or the thumbnail images displayed on the confirmation screen with the print contents of the respective paper sheets. Therefore, if the sheet ejection information is deleted only on the condition that paper sheets are removed from the second ejection destination, the sheet ejection information disappears before the user compares the read images with the printed material, and the confirmation screen necessary for the user is not displayed. In view of this, sheet ejection information is deleted after the second condition described above is satisfied.

The above second condition is adopted for the following reasons. It is considered that the user issues a deletion instruction after completing an abnormal sheet removal checking operation. Further, it is considered that the user resumes the next printing after completing an abnormal sheet removal checking operation. Therefore, the past sheet ejection information is removed on condition that the next printing is resumed, or an abnormal paper sheet is newly detected and is ejected to the second ejection destination in the resumed printing.

Note that the image forming system 5 can also cause the communication unit 42 to transmit the sheet ejection information stored in the storage 43 to the external terminal 3 through the network 2. On the basis of the sheet ejection information received from the image forming system 5, the external terminal 3 displays a confirmation screen in the list format, the page turning format, the thumbnail format, or the like.

Although an embodiment of the present invention has been described so far with reference to the accompanying drawings, specific configurations are not limited to the embodiment, and modifications and additions within the scope of the invention are included in the present invention.

In the embodiment, the information stored as sheet ejection information in the storage 43 is required to include at least the information indicating whether the paper sheet is an abnormal paper sheet, the stacking order at the second ejection destination, and a read image. Other information such as a job name may be added or removed as appropriate.

The display mode of sheet ejection information is not limited to the confirmation screens described as examples in the embodiment. Further, the paper sheets to be ejected to a second ejection destination are not limited to abnormal paper sheets, succeeding paper sheets, and an adjustment chart.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming system comprising:
    a sheet feeder;
    an image former that forms an image on a paper sheet;
    a conveyor that conveys a paper sheet supplied from the sheet feeder to a sheet ejection destination via the image former;
    a switcher that switches sheet ejection destinations;
    a reader that optically reads a paper sheet being conveyed by the conveyor between the image former and the switcher, and outputs a read image;
    an abnormal sheet detector that detects an abnormal paper sheet by analyzing the read image;
    a storage;
    a display; and
    a hardware processor that performs: ejection destination switch control to control the switcher to eject an abnormal paper sheet detected by the abnormal sheet detector and a succeeding paper sheet following the abnormal paper sheet to a second ejection destination different from a regular ejection destination; storage control, for each of the abnormal paper sheet and the succeeding paper sheet ejected to the second ejection destination, to associate sheet information indicating whether a paper sheet is an abnormal paper sheet, the read image of the paper sheet, and a stacking order of the paper sheet at the second ejection destination with one another, and store the sheet information, the read image, and the stacking order into the storage; and display control to cause the display to display the sheet information, the stacking order, and the read image associated with one another and stored in the storage, the sheet information, the stacking order, and the read image being associated with one another on the display.

2. The image forming system according to claim 1, wherein
    the sheet information includes at least one of a sheet catch tray number, a date and time of sheet ejection, a job name, a page number, a cause of waste, and a sheet feed tray number.

3. The image forming system according to claim 1, wherein,
    in the display control, the sheet information, the stacking order, and the read image that are associated with one another are displayed, for a plurality of paper sheets, in one of a list format, a thumbnail format, and a page turning format.

4. The image forming system according to claim 1, wherein
    the second ejection destination is a sheet ejection destination that is determined beforehand as a sheet ejection destination of abnormal paper sheets and succeeding paper sheets.

5. The image forming system according to claim 1, wherein,
    in the storage control, for all paper sheets ejected to the second ejection destination, sheet information indicating whether a paper sheet is an abnormal paper sheet, a read image of the paper sheet, and a stacking order of the paper sheet at the second ejection destination are associated with one another, and are stored into the storage.

6. The image forming system according to claim 1, further comprising
    a removal detector that detects paper sheet removal from the second ejection destination,
    wherein, when the removal detector detects paper sheet removal from the second ejection destination, and a predetermined second condition is satisfied, the hardware processor deletes information stored in the storage.

7. The image forming system according to claim 1, wherein,
    when paper sheets relating to a plurality of jobs have been ejected to the second ejection destination, the hardware processor is allowed to perform the display control on a job-by-job basis.

8. The image forming system according to claim 7, wherein
    the hardware processor determines whether to perform the display control on a job-by-job basis, in accordance with selection by a user.

9. The image forming system according to claim 1, wherein,
    when switching the second ejection destination to a plurality of sheet ejection destinations in the ejection destination switch control, the hardware processor performs the display control for each ejection destination.

10. The image forming system according to claim 1, further comprising
    a transmitter that transmits information stored in the storage in the storage control, to outside.

11. The image forming system according to claim 1, further comprising
    a fullness detector that detects that the second ejection destination is full,
    wherein, when the fullness detector detects that the second ejection destination is full, the hardware processor starts the display control.

12. The image forming system according to claim 1, wherein,
    even when the image former is not forming an image, all succeeding paper sheets to be ejected to the second ejection destination are read by the reader.

13. An abnormal sheet information display method, comprising:
    optically reading a paper sheet being conveyed with a reader on a downstream side of an image former, to acquire a read image;
    detecting an abnormal paper sheet by analyzing the read image;
    switching sheet ejection destinations on a downstream side of the reader, to eject the detected abnormal paper sheets and the succeeding paper sheet to a second ejection destination different from a regular ejection destination;
    storing, into a storage, sheet information indicating whether a paper sheet is an abnormal paper sheet, a read image of the paper sheet, and a stacking order of the paper sheet at the second ejection destination, the sheet information, the read image, and the stacking order being associated with one another, the storing being performed for an abnormal paper sheet and succeeding paper sheets ejected to the second ejection destination; and causing the display to display the sheet information, the stacking order, and the read image associated with one another and stored in the storage, the sheet information, the stacking order, and the read image being associated with one another on the display.

* * * * *